C. L. INGLEFIELD.
WATT HOUR METER.
APPLICATION FILED DEC. 15, 1914.

1,276,925.

Patented Aug. 27, 1918.
3 SHEETS—SHEET 1.

Witnesses
Oscar V. Payne
Herman Jakobsson

Inventor
Charles L Inglefield
By Knight Bros
Attorneys

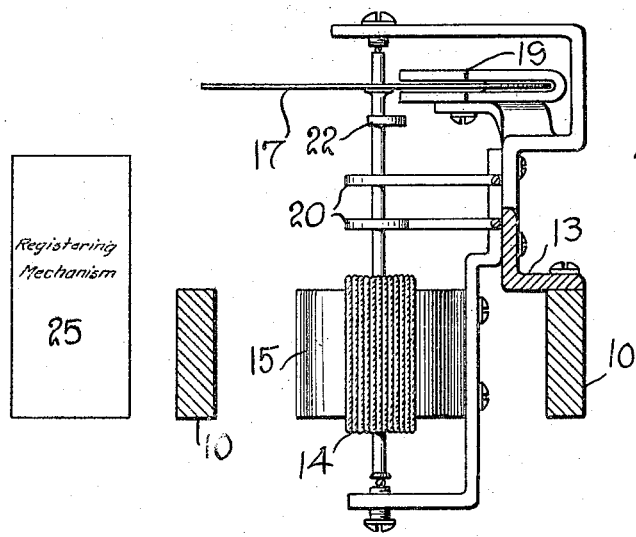
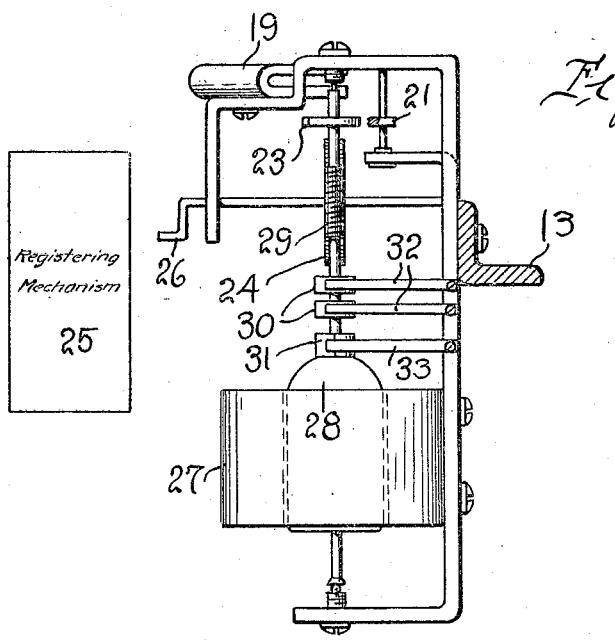

C. L. INGLEFIELD.
WATT HOUR METER.
APPLICATION FILED DEC. 15, 1914.
1,276,925.
Patented Aug. 27, 1918.
3 SHEETS—SHEET 3.
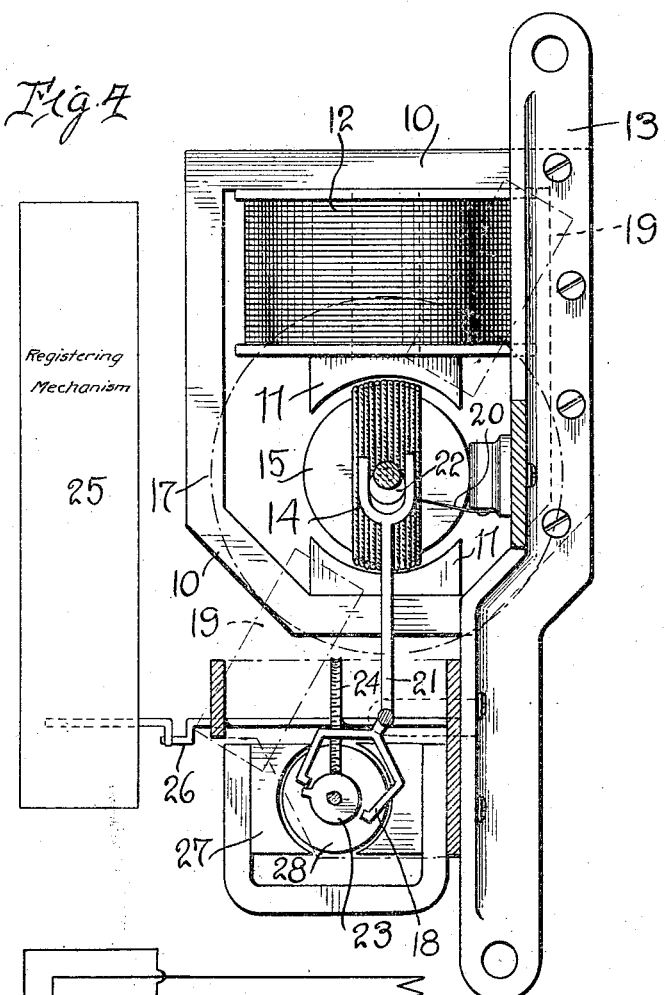
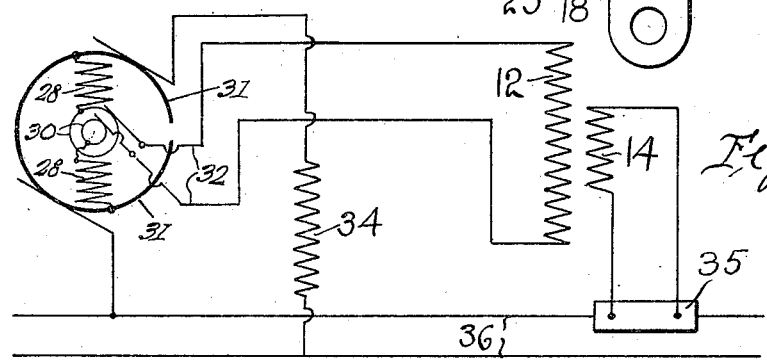
Witnesses
Oscar V. Payne
Herman Jakobsson
Inventor
Charles L. Inglefield.
By Knight Bros
Attorneys

UNITED STATES PATENT OFFICE.

CHARLES L. INGLEFIELD, OF MIDLAND, PENNSYLVANIA.

WATT-HOUR METER.

1,276,925.  Specification of Letters Patent.  Patented Aug. 27, 1918.

Application filed December 15, 1914. Serial No. 877,385.

*To all whom it may concern:*

Be it known that I, CHARLES L. INGLE-FIELD, a citizen of the United States, residing at Midland, in the county of Beaver and State of Pennsylvania, have invented certain new and useful Improvements in Watt-Hour Meters, of which the following is a specification.

In the present types of direct current watthour meters as usually constructed, an electric motor consisting of a field winding in series with the load to be measured and an aramture winding excited by the potential of the circuit, drives an aluminum disk which revolves in the field of a permanent magnet. The torque developed by the motor is proportional to the product of the voltage and current of the circuit to be measured and therefore the speed is proportional to the wattage, thus making the number of revolutions of the meter proportional to the watthours of electrical energy supplied to the circuit.

This type of meter has a commutator and brushes for transmitting the current from the stationary member to the armature or rotating member. The pressure of the brushes against the commutator introduces friction which retards the free motion of the armature, and this interferes with the accuracy of the meter. In order to reduce this friction the brush pressure must be low, thus making an uncertain contact and introducing a variable amount of friction which is difficult to compensate. The uncertainty of the contact prevents the meter from holding its calibration.

The object of this invention is to eliminate this variable and uncertain element.

Instead of requiring the meter element to drive the registering mechanism and overcome brush friction, my instrument is provided with a small electric motor which is sufficiently powerful to perform these functions and the meter element is used as a control element only, thus being free from the errors due to the above causes.

This constitutes the principal departure from standard practice, and is the principle upon which it is thought an application for Letters Patent may be based.

Most watthour meters use an air magnetic circuit requiring powerful magnetomotive force to develop the required torque because of the great reluctance of the magnetic circuit. It has been found undesirable to use iron in the magnetic circuit heretofore, because of hysteresis of the iron.

In the accompanying drawings:—

Figure 1 shows a diagram of the voltage and flux in the present type of direct current watthour meters;

Fig. 2, a similar diagram for the watthour meter of the present application;

Fig. 3 is an elevation of the meter element proper representing one embodiment of the invention;

Fig. 4 is a plan view of Fig. 3;

Fig. 5 is an elevation of the motor element and

Fig. 6 is a diagram of the connections for this device.

Figure 1:
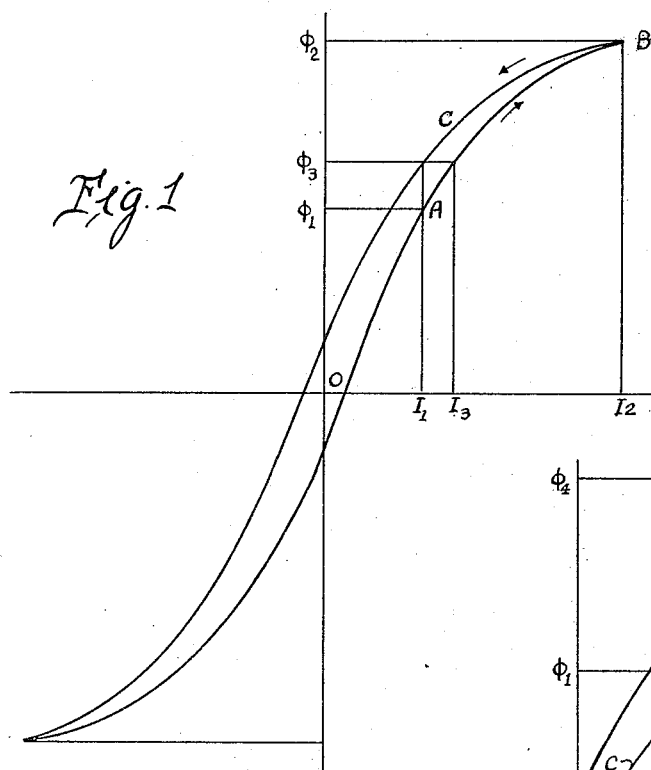

The action of a meter provided with an iron magnetic circuit energized by a current flowing always in one direction may be understood from Fig. 1 which represents a typical hysteresis curve. We will now suppose the current element to be wound on an iron core, the abscissæ to represent load current in amperes and the ordinates to represent the corresponding magnetic fluxes produced, and also suppose the iron to be originally demagnetized and then magnetized by the current $I_1$, thus developing the flux $\varphi_1$. If now the load current is increased to $I_2$ the flux will be increased along the curve A B to the value $\varphi_2$. Then if the load current be reduced to its original value $I_1$, the flux will be diminished along the curve $\overline{B\ C}$ to a value $\varphi_3$. It is evident that with a load current $I_1$, the meter will now run as fast as though a current $I_3$ had been passed through it in its original demagnetized condition. In other words the current has fallen to its former value, but the flux has not and more magneto motive force and more torque are produced, thus introducing a considerable error. This characteristic makes it difficult to construct an accurate meter with an iron magnetic circuit if the current flows always in one direction.

The foregoing difficulty is overcome in my invention by periodically reversing the flux through the magnetic circuit and thus wiping out all residual or hysteresis effects.

Figure 2:
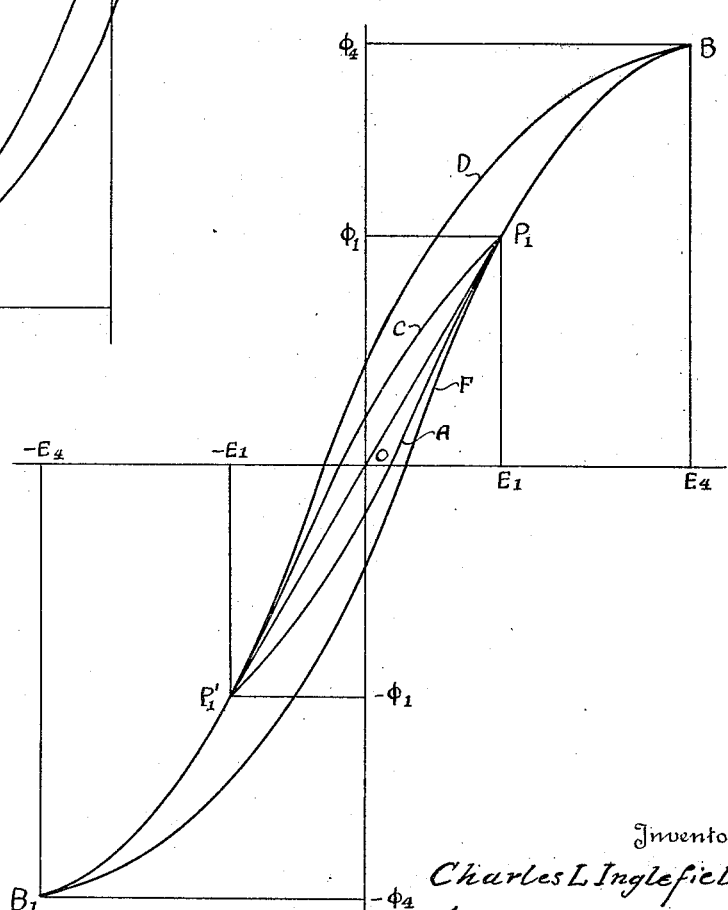

In my invention the potential element is wound on an iron core and its action may be understood by referring to Fig. 2, in which the abscissæ represent voltages and ordinates represent the fluxes produced.

If a line voltage $E_1$ be impressed upon the potential winding, the resultant magnetic flux in the iron core will build up along the curve O. $P_1$ to a value $\varphi_1$. Now since the polarity of the potential circuit is undergoing periodic reversal due to the action of the driving motor, the impressed voltage $E_1$ will be reduced to zero and an equal and opposite voltage $-E_1$ will be impressed, thus causing the flux $\varphi_1$ to decrease along the curve $P_1$ C $P_1^1$ and assume an equal and opposite value $-\varphi_1$. The flux is then again reversed and following the curve $P_1^1$ A $P_1$ reaches its original value $\varphi_1$. As long as the line voltage remains numerically equal to $E_1$, the magnetic flux will follow the hysteresis curve A $P_1$ C $P_1^1$ A.

Now suppose the line voltage to be increased to $E_4$, thereby increasing the flux curve $P_1$ B to value $\varphi_4$. The periodic reversal of polarity now carries the flux through the cycle F $P_1$ B D $P_1^1$ $B_1$ F. If now the line voltage be reduced to its original value $E_1$, the flux will be built up along curve A $P_1$ B to $P_1$ and its original value $\varphi_1$. It is evident that the effects of previous loads are automatically wiped out and that the flux produced is always proportional to the voltage except at the instant of reversal.

By arranging the two segment commutators on the driving motor so that the reversal is accomplished at the point of greatest angular velocity, the hysteresis error during the instant of reversal may be reduced to a minimum. By selecting as a normal working voltage the point on the curve F $P_1$ B where a line drawn through the origin becomes tangent to the curve, it is evident that variations of voltage will produce almost exactly proportional changes in flux.

The advantage to be gained in this meter are the reductions of size and cost due to the presence of iron in the magnetic circuit. It also permits a powerful torque to be developed by shunting a small percentage of the current from the main circuit instead of the necessity of carrying the entire line current through the meter, thus again reducing size and cost of meter and bus structure and making the instrument more flexible. And the success of the present device resides in the method of eliminating hysteresis by reversal of the field. The use of an escapement mechanism actuated by the moving meter element to control the motion of the driving motor carrying the commutator or reverse switch, also contributes to the efficiency of the device. This construction relieves the measuring element of the burden of the operation of the commutator and gear train. It also permits the use of strong brush pressure on the commutator, thereby insuring good contacts which are always more or less unreliable in the usual forms of direct watthour meters.

The above description covers the principal electrical features of the invention and by reference to Figs. 3, 4 and 5, the mechanical construction as tentatively adopted may be understood.

Fig. 4 is a plan view of the essential mechanism of the whole meter, Fig. 3 is an elevation of that element in which the results of varying voltage and current are combined to produce an action proportional to the watthour of load measured and which is therefore the meter element proper. Fig. 5 is an elevation of the driving motor that furnishes power for the operation of the counting mechanism.

Referring to Figs. 3, 4 and 5 an iron magnetic circuit 10 is shown carrying a potential winding 12 and the pole shoes 11, 11, the whole being supported from a suitable frame 13.

14 is a movable current coil that oscillates through an arc of about 100° in the space formed between pole shoes 11, 11 and 15 is a stationary iron core that is supported on an extension of the frame 13. On the same shaft with the movable coil 14 is provided a brake disk 17 and on the frame 13 are secured two conducting springs 20 which furnish an electrical connection to coil 14. These springs are oppositely wound so as not to impede the free motion of coil 14. 19, 19 are damping or drag magnets, one or more of which are required to maintain the speed of coil 14 proportional to the torque. An escapement bar 21 with claws or pallets 18 operated by an eccentric 22 serves to control the motion of the driving motor at the single tooth escapement wheel 23. A worm wheel 24 operated by a worm 29 on the driving motor shaft serves to transfer the movement of the driving motor to the registering mechanism 25, through contact dog 26. Permanent field poles 27, 27 and armature 28 of the driving motor are also shown.

In Fig. 3 the oppositely wound conducting springs are shown at 20. In Fig. 5 are shown slip rings 30, 30 electrically connected through the windings of the armature 28 to the segments of the two part commutator 31. Brushes 32, 32 for the slip rings 30, 30 are secured on the frame 13 and form the terminals of potential winding 12. The brushes of the driving motor are denoted by 33.

From Fig. 6 it may be seen that the potential winding 12 is connected in series through slip rings 30 and segments 31 with the armature winding 28 and an outside adjustable resistance 34 and will always carry a small current depending upon the line voltage and the adjustable resistance.

It will be evident that the driving motor always has a tendency to rotate since there is always a current in the armature and a flux through the armature. As long as there is no load on the mains 36 there is no drop of potential through the load shunt 35 and therefore no current and no motion in the winding 14.

The escapement bar 21 will therefore remain in a fixed position and one of its claws, by engaging the single tooth on the escapement wheel 23 will prevent any rotation of the driving motor.

Supposing now that a measurable load is placed on the mains, the drop of potential through the load shunt 35 will cause a proportional current to flow through current coil 14. This coil being in a magnetic field produced by potential winding 12 will now deflect to one side or the other depending upon the polarity of the current in winding 12.

The diameter of disk 17 and the strength of magnets 19 will regulate the speed of deflection of coil 14.

When this coil has reached the extremity of its oscillation the eccentric 22 will have moved the bar 21 sufficiently to disengage the single tooth on the escapement wheel 23 from one of the escapement claws 18. The driving motor being now free to turn will rotate one half revolution or until the tooth engages the opposite one of the escapement claws 18. During this rotation the segments of commutator 31 will have reversed their position with reference to brushes 33.

The polarity of the current in armature winding 28 being now reversed, the polarity of the current in coil 12 which is in series with the armature windings through the slip rings 30 and brushes 32 will also be reversed. The flux through coil 14 being now reversed and the current polarity unchanged, coil 14 will deflect in a direction opposite to its original direction and the above cycle of operations be repeated.

So long as there is any load to be measured the current coil 14 will continue to oscillate from side to side controlling the motion of the driving motor which will rotate in one direction by half revolutions a definite number of turns proportional to the load measured, thus indicating the proper consumption on the registering mechanism.

In some cases spring buffers may be needed to overcome the inertia of the disk 17 at the moment of reversal and improve the time constant of the meter.

I claim:—

1. In an electric meter, the combination of a registering mechanism, a motor for operating said mechanism, an escapement mechanism restraining the rotation of said motor, said mechanism being responsive to the electrical conditions of the circuit to be measured for operating the escapement mechanism, and means for periodically changing the direction of flow of current through said escapement mechanism.

2. In an electric meter, the combination of a registering mechanism, a motor for operating said mechanism, an escapement mechanism restraining the rotation of said motor, said mechanism being responsive to the electrical conditions of the circuit to be measured for operating the escapement mechanism, and means carried by the aforesaid operating motor for periodically changing the direction of flow of current through the said escapement mechanism.

3. In an electric meter, the combination of a registering mechanism, a motor for operating said mechanism, an escapement mechanism for restraining the rotation of said motor, said escapement mechanism comprising a motor having an oscillative armature, and means for periodically reversing the current in said oscillative armature during the period of measurement of the meter.

4. An electric meter including a potential winding and an oscillative current coil coöperating therewith, in combination with a registering mechanism, a motor for operating said mechanism, an escapement mechanism for restraining the rotation of said motor, said mechanism being responsive to the electrical conditions of the circuit to be measured for operating the escapement, and means for periodically changing the direction of flow of current in said potential winding.

5. An electric meter including a potential winding and an oscillative current coil coöperating therewith, in combination with a registering mechanism, a motor for operating said registering mechanism, an escapement mechanism for restraining the rotation of said motor, said escapement mechanism being responsive to the electrical conditions of the circuit to be measured for operating the escapement mechanism, and means carried by the motor for changing the direction of flow of current through the said potential winding to cause an oscillation of the current coil.

6. An electric meter including a potential winding and an oscillative current coil coöperating therewith in combination with a registering mechanism, a motor for operating said mechanism, an escapement mechanism for restraining the rotation of said motor, said escapement mechanism comprising a potential winding and an oscillative coil between the poles of said winding, said escapement mechanism being responsive to the combined magnetic influences set up by the potential winding, and the oscillative coil, and means for periodically changing the direction of flow of current in said potential winding.

7. An electric meter including a potential winding and an oscillative current coil coöperating therewith, in combination with a registering mechanism, a motor for operating said mechanism, an escapement mechanism for restraining the rotation of said motor, said escapement mechanism comprising a potential winding and an oscillative coil between the poles of said winding, said escapement mechanism being responsive to the combined magnetic influences set up by the potential winding and the oscillative coil, and means for periodically changing the direction of flow of current in the potential winding. the potential winding having an iron-core frame and two opposing poles to permit a limited oscillation of said coil.

8. An electric meter including a registering mechanism, a motor for operating said mechanism, an escapement mechanism restraining the rotation of said motor, said escapement mechanism comprising a potential winding and an oscillative coil between the poles of said winding, said escapement mechanism being responsive to the combined magnetic influences set up by the potential winding and the oscillative coil, and means for periodically changing the direction of flow of current in said potential winding, said winding having an iron-core frame and two opposing poles, said potential winding being electrically connected with the armature of said motor.

9. An electric meter including a registering mechanism, an electric commutator motor for operating said mechanism, an escapement mechanism for restraining the rotation of said motor, said mechanism comprising a potential winding in circuit with said commutator motor, and an oscillative coil between the poles of the said winding, and means for changing the direction of flow of current through said potential winding, said winding having an iron-core frame and two opposing poles, the means for reversing the direction of current and potential winding comprising a two part commutator for the motor in operative connection with the registering mechanism.

10. The method of operating a direct current integrating meter comprising a potential coil and an iron core subjected to variations in flux produced by variations in the excitation of said coil, consisting in periodically reversing the current through said potential coil, whereby inaccuracies due to hysteresis are reduced.

11. In an electric meter, the combination with a registering mechanism, an electric commutator motor for operating said mechanism in circuit with the current to be measured, an escapement mechanism restraining the rotation of said motor, said escapement mechanism comprising an electro-magnet, an oscillatory coil between the poles of the magnet, and a spindle for the oscillatory coil, an eccentric rigidly mounted on said spindle, a rock bar engaging with said eccentric, a pair of pallets on the free end of the bar and a single tooth escapement wheel in positive connection with the motor and meshing with said pallet thereby permitting only a half revolution for the motor for each throw of the bar.

12. In an electric meter, the combination of a registering mechanism, an electric commutator motor for operating said mechanism in circuit with the current to be measured, an escapement mechanism restraining the rotation of said motor, said escapement mechanism comprising an electro-magnet, an oscillatory coil between the poles of said magnet, and a spindle for the oscillatory coil, said escapement mechanism having an eccentric rigidly mounted on said spindle, a rock bar engaging with said eccentric, a pair of pallets on the free end of the bar, and a single tooth escapement wheel in positive connection with the motor and meshing with said pallets thereby permitting only a half revolution of said motor for each oscillation of said coil.

13. In an electric meter, the combination of a registering mechanism, an electric commutator motor for operating said mechanism in circuit with the current to be measured, an escapement mechanism restraining the rotation of said motor, said escapement mechanism comprising an electro-magnet, an oscillatory coil between the poles of said magnet, and a damping means for said coil, said oscillatory coil positioned in the circuit of a main, the electro-magnet having an iron-core frame and two opposing poles permitting a limited oscillation by said coil, a potential winding electrically connected with the armature of said motor, and a two part commutator for said motor for changing the polarity of said magnetic poles for each half revolution of the motor, and a spindle for the oscillatory coil, said escapement mechanism having an eccentric rigidly mounted on said spindle, a rock bar engaging with the eccentric, a pair of pallets on the free end of the bar and a single tooth escapement wheel in positive connection with the motor and meshing with said pallets, thereby permitting only a half revolution of said motor for each oscillation of said coil.

The foregoing specification signed at Midland, Beaver county, Pa., this twelfth day of December, 1914.

CHAS. L. INGLEFIELD.

In presence of—
SANFORD E. D. BERRY,
PARK R. BRENNEMAN.

Copies of this patent may be obtained for five cents each, by addressing the "Commissioner of Patents, Washington, D. C."